UNITED STATES PATENT OFFICE.

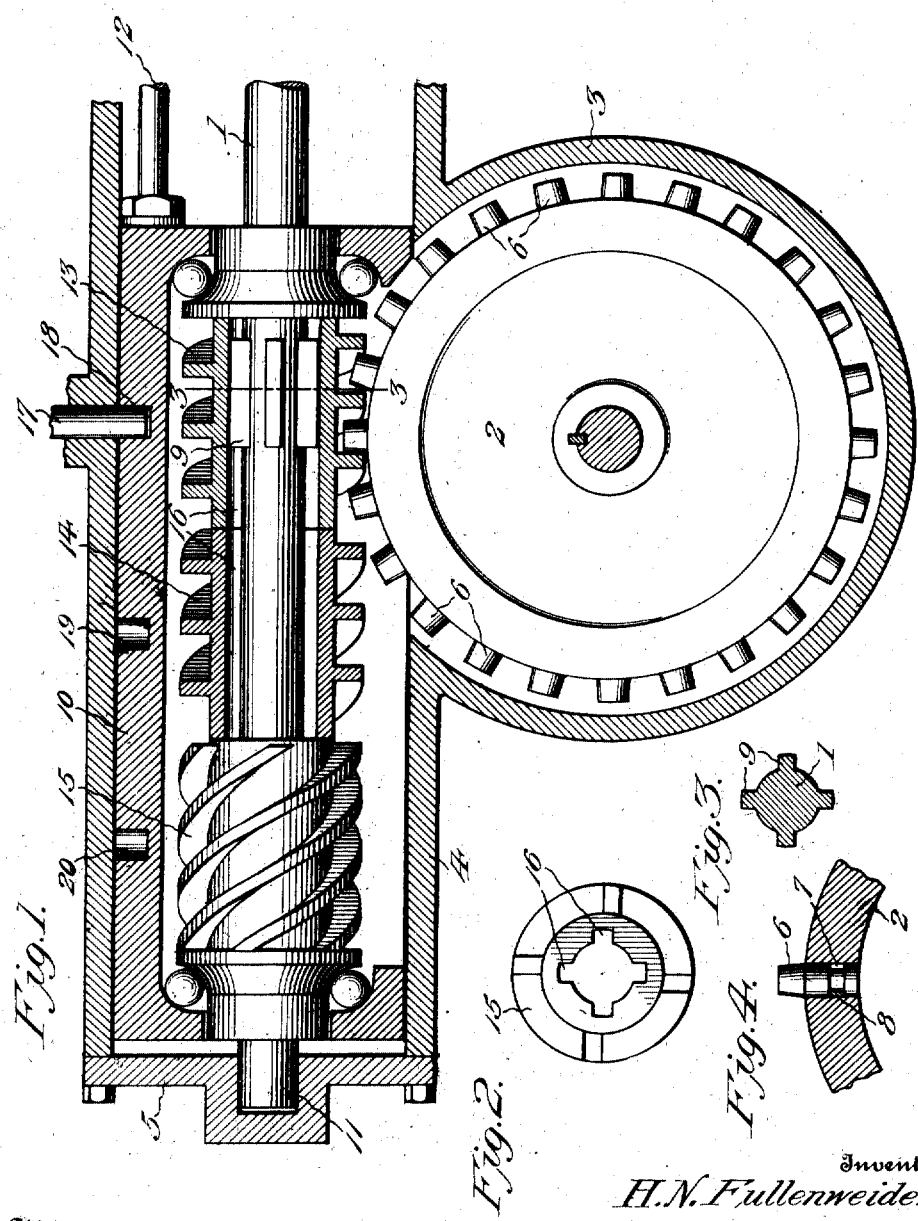

HENRY N. FULLENWEIDER, OF WAVELAND, INDIANA.

TRANSMISSION-GEARING FOR MOTOR-VEHICLES.

1,252,338.　　　　Specification of Letters Patent.　　　Patented Jan. 1, 1918.

Application filed July 1, 1914.　Serial No. 848,426.

*To all whom it may concern:*

Be it known that I, HENRY N. FULLENWEIDER, a citizen of the United States, residing at Waveland, in the county of Montgomery and State of Indiana, have invented new and useful Improvements in Transmission-Gearing for Motor-Vehicles, of which the following is a specification.

This invention relates to transmission gearing for motor vehicles, the object in view being to produce a simple and reliable mechanism for varying the relative speeds of the driving shaft and driving axle and to so associate the mechanism of this invention with the usual differential gearing that it will occupy a close relation to the master gear of the differential gearing, the said master gear in fact serving as the driven element of the transmission gearing.

With the above and other objects in view, the invention consists in the novel construction, combination and arrangement of parts, as will be hereinafter more fully described, illustrated and claimed.

In the accompanying drawings:—

Figure 1 is a vertical longitudinal section through one form of transmission gearing embodying the present invention, said section extending also through the housing of the differential gearing, some of the parts being in elevation.

Fig. 2 is an end elevation of one of the worm gears.

Fig. 3 is a detail cross section through the drive shaft on the line 3—3 of Fig. 1.

Fig. 4 is a detail fragmentary section of the master gear showing the manner of mounting the teeth of said gear.

Referring primarily to Figs. 1 to 4 inclusive, 1 designates the usual driving shaft of a motor vehicle, usually coupled to and actuated by the engine. 2 designates the master gear of the differential gearing and 3 the housing of the last named gearing, which housing is extended to form the housing 4 of the transmission gearing of this invention, the last named housing 4 being closed at one end by means of a detachable cap 5 which when removed permits the entire transmission gearing to be withdrawn from the housing 4.

In carrying out the present invention the master gear 2 is provided with teeth 6 each of which is mounted to rotate relatively to the periphery of the gear as shown in Fig. 4 wherein a tooth 6 is shown as formed with a groove 7 therein to receive a key 8 which permits the tooth to turn freely within its socket or opening in the body of the gear and yet prevents the escape and loss of said tooth.

The driving shaft 1, under the present invention, extends in a plane tangential to the periphery of the master gear 2 and is provided with any desired number of keys 9 as shown in Fig. 3, said keys being of a certain length relatively to the length of each of the worm gears hereinafter described. Mounted within the housing 4 is a slidable cage 10 which is movable longitudinally of and upon the drive shaft 3, said drive shaft having its rear extremity journaled in a bearing extension 11 of the detachable cap 5 at the rear end of the housing. The cage 10 is shifted longitudinally of the shaft 1 and the housing 4 by means of a gear shift rod 12 which is adapted to be connected to and actuated by the usual hand operated gear shift lever now in present use on automobiles and other motor vehicles.

Mounted on the shaft 1 and within the cage 10 are worm gears 13, 14 and 15, the last named worm constituting the reverse gear, the threads thereon being pitched reversely to the threads of the forward driving gears 13 and 14. Each of the worm gears is formed with grooves 16 interiorly threaded and corresponding in number to the number of keys 9 on the shaft 1 as shown in Fig. 2 and the keys 9 are of a length less than one-half the length of each worm gear 13, 14 and 15 so that each worm gear must necessarily be disconnected from the driving shaft 1 before another worm gear is connected therewith by means of said keys 9. This prevents any possibility of two of the worm gears being locked to the shaft at the same time which would be disastrous to the teeth of the gears concerned.

The worm gears 13, 14 and 15 are entirely independent from each other and each is normally loose on the driving shaft 1 and only thrown into interlocked engagement therewith when the cage 10 is slid longitudinally along the driving shaft 1 so as to bring the desired worm gear into operative relation to the master gear 2. The gear 13 constitutes the low speed gear. The gear 14 has teeth of greater pitch and therefore constitutes a higher speed or under the construction shown the high speed gear while the worm gear 15 having its teeth reversely pitched, constitutes what is known as the reverse gear. While the gearing shown in Fig. 1 provides for only two speeds forward and one speed reverse, it will of course be understood that by providing additional worm gears, any desired number of speeds may be obtained.

The sliding cage 10 is held locked in any one of several determinate positions by means of a detent 17 shown in the form of a pin movable into and out of engagement with a number of sockets 18, 19 and 20 corresponding with the worm gears 13, 14 and 15 to hold the latter in a certain fixed relation to the master gear 2. Ordinarily the locking pin will be operated by suitable connections from the gear shift lever or from the clutch pedal so that when the clutch is in, the cage is locked and the cage is not released until the clutch is thrust out. The circular formation of the teeth 6 provide for shifting any one of the worm gears into and out of engagement with the master gear, which would not be possible with the teeth 6 of the ordinary spiral or spur type.

From the foregoing description taken in connection with the accompanying drawings it will now be understood that it is a simple matter to change the ratio between the driving shaft and the driving axle of a motor vehicle. The change from one speed to another is made with facility and the locking mechanism referred to prevents the stripping of the gear teeth by the engagement of more than one worm gear at a time with the driving shaft and the master gear. It is a comparatively simple matter to detach the cap 5 of Fig. 1, whereupon the worm gears may be removed and replaced or interchanged with other worm gears of different pitch as may be deemed expedient or as required by the particular class of work to be performed by the motor vehicle.

The invention is designed primarily for use on automobiles, motor trucks, motorcycles and tractors but is also applicable to many other machines such as lathes and the like where variation in speed or gear ratio is desirable.

What I claim is:—

A master differential gear having teeth on the periphery thereof, in combination with a non-shiftable driving shaft tangential to said master gear, a plurality of independent worm gears normally loose on said driving shaft and arranged end to end and adapted to be positioned one at a time in mesh with said master gear, a cage in which the worm gears are rotatably mounted and by means of which they are adapted to be shifted along said shaft, means whereby any one of said worm gears may be locked to said driving shaft only while in mesh with said master gear leaving the remaining gears free and idle, and means for locking said cage while any one of said worm gears is in mesh with the master gear.

In testimony whereof I affix my signature in presence of two witnesses.

HENRY N. FULLENWEIDER.

Witnesses:
R. HEATH,
DUMONT KENNEDY.